(12) United States Patent
Petit et al.

(10) Patent No.: US 11,652,830 B2
(45) Date of Patent: *May 16, 2023

(54) MISBEHAVIOR PROTECTION FOR CONNECTED VEHICLE COMMUNICATION

(71) Applicant: OnBoard Security, Inc., San Diego, CA (US)

(72) Inventors: Jonathan Petit, Wenham, MA (US); Mohammad Raashid Ansari, Lowell, MA (US)

(73) Assignee: OnBoard Security, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,139

(22) Filed: Jan. 5, 2022

(65) Prior Publication Data

US 2022/0201015 A1 Jun. 23, 2022

Related U.S. Application Data

(63) Continuation of application No. 16/501,283, filed on Mar. 15, 2019, now Pat. No. 11,290,470.

(60) Provisional application No. 62/761,325, filed on Mar. 16, 2018.

(51) Int. Cl.
| | |
|---|---|
| *G06F 15/16* | (2006.01) |
| *G06F 15/00* | (2006.01) |
| *G08G 1/16* | (2006.01) |
| *H04L 9/40* | (2022.01) |
| *H04L 67/12* | (2022.01) |

(52) U.S. Cl.
CPC ...... *H04L 63/1416* (2013.01); *H04L 63/1425* (2013.01); *H04L 67/12* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 5,367,458 | A | * | 11/1994 | Roberts ................ G05D 1/0244 701/25 |
| 5,642,106 | A | * | 6/1997 | Hancock ................ G01C 21/12 340/975 |
| 11,290,470 | B2 | * | 3/2022 | Petit ........................ H04L 67/12 |

(Continued)

*Primary Examiner* — Jude Jean Gilles
(74) *Attorney, Agent, or Firm* — Polsinelli LLP (57) ABSTRACT

The application is applicable for use in conjunction with a system that includes connected vehicle communications in which vehicles in the system each have an onboard processor subsystem and associated sensors, the processor subsystem controlling the generation, transmission, and receiving of messages communicated between vehicles for purposes including crash avoidance. A method is set forth for determining, by a given vehicle receiving messages, the occurrence of misbehavior, including the following steps: processing received messages by performing a plurality of plausibility determinations to obtain a respective number of plausibility measurements; determining at least one context for the region at which the given vehicle is located; weighting the plurality of plausibility measurements in accordance with values determined from the at least one context to obtain a respective plurality of plausibility indicator values; and deriving a misbehavior confidence indicator using the plausibility indicator values.

25 Claims, 6 Drawing Sheets

(56) References Cited

U.S. PATENT DOCUMENTS

| | | | |
|---|---|---|---|
| 2005/0010351 A1* | 1/2005 | Wagner | B60T 7/22 |
| | | | 180/170 |
| 2006/0113119 A1* | 6/2006 | Dudeck | B62D 15/028 |
| | | | 180/6.2 |
| 2009/0055095 A1* | 2/2009 | Urban | B60W 40/02 |
| | | | 701/301 |
| 2009/0222159 A1* | 9/2009 | Bauer | G01S 5/0263 |
| | | | 701/23 |
| 2009/0326791 A1 | 12/2009 | Horvitz et al. | |
| 2010/0085238 A1* | 4/2010 | Muller-Frahm | G01S 13/867 |
| | | | 342/70 |
| 2011/0072085 A1 | 3/2011 | Standley | |
| 2012/0053888 A1* | 3/2012 | Stahlin | G01S 19/48 |
| | | | 702/150 |
| 2013/0070086 A1* | 3/2013 | Seifert | G01B 11/275 |
| | | | 348/135 |
| 2013/0218379 A1 | 8/2013 | Filev et al. | |
| 2014/0257634 A1* | 9/2014 | Stahlin | B60W 50/0098 |
| | | | 701/36 |
| 2016/0041035 A1 | 2/2016 | Allen et al. | |
| 2016/0140842 A1 | 5/2016 | Park et al. | |
| 2016/0335897 A1 | 11/2016 | Naserian et al. | |
| 2017/0332208 A1 | 11/2017 | Cardoso De Moura et al. | |
| 2017/0365171 A1 | 12/2017 | Haran | |
| 2019/0312896 A1* | 10/2019 | Petit | H04L 63/1416 |
| 2020/0139980 A1 | 5/2020 | Liu et al. | |

* cited by examiner

MISBEHAVIOR PROTECTION FOR CONNECTED VEHICLE COMMUNICATION

RELATED APPLICATION

This application is a continuation of U.S. Non-Provisional patent application Ser. No. 16/501,283, filed Mar. 15, 2019, which claims priority from U.S. Provisional Patent Application No. 62/761,325, filed Mar. 16, 2018, both of which are incorporated herein by reference for all purposes.

FIELD OF THE APPLICATION

This application relates to the field of connected vehicle communication and, more particularly, to a method and system of misbehavior protection for connected vehicle communication.

BACKGROUND OF THE APPLICATION

A part of the background hereof is disclosed in W. Whyte, A. Weimerskirch, V. Kumar, and T. Hehn, "A Security Credential Management System For V2V Communications", IEEE Vehicular Networking Conference, 2013. (The security credential management system described therein is sometimes referred to as "SCMS.") The SCMS for vehicle-to-vehicle ("V2V") communication was developed under a cooperative agreement with the US Department of Transportation. The system issues digital certificates to participating vehicles for establishing trust among them, which is necessary for safety applications primarily crash-avoidance. It supports four main use cases, namely, bootstrapping, certificate provisioning, misbehavior reporting and revocation. Regarding vehicle misbehavior in the context of SCMS, reference can be made to copending U.S. patent application Ser. No. 16/350,582, filed Dec. 3, 2018, of V. Kumar et al., and to U.S. patent application Ser. No. 16/350,955, filed Feb. 4, 2019, of J Petit et al., both Applications being assigned to the same assignee as the present Application.

Figure 1:
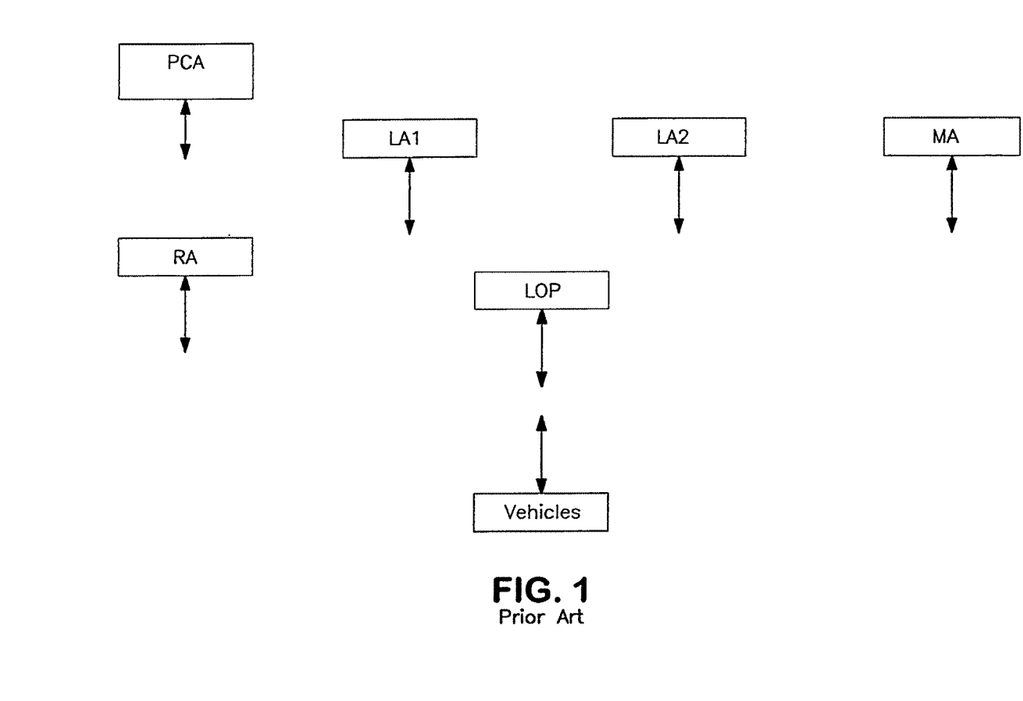
FIG. 1 is a simplified block diagram of part of a prior art security credential management system for vehicle-to-vehicle communication.

FIG. 1 is a simplified diagram of portions of the Security Credential Management System (SCMS) as disclosed in Whyte et al., 2013, supra, incorporated herein by reference. (An updated version of the SCMS is disclosed in Benedikt Brecht, Dean Therriault, Andre Weimerskirch, William Whyte, Virendra Kumar, Thorsten Hehn, and Roy Goudy, "A Security Credential Management System for V2X Communications." In IEEE Transactions on Intelligent Transportation Systems, pp. 1022, 2018, which maintains, for the most part, the general nature of the SCMS described in the 2013 document.) In FIG. 1, the Pseudonym Certificate Authority (PCA) issues pseudonym certificates to devices (especially, vehicles). The Registration Authority (RA) validates, processes, and forwards requests for pseudonym certificates to the Pseudonym Certificate Authority. The Misbehavior Authority (MA) processes misbehavior reports to identify potential misbehavior by devices and, if necessary, revokes and adds devices to a Certificate Revocation List (not shown). It also initiates the process of linking a certificate identifier to the corresponding enrollment certificate, and adding the enrollment certificate to an internal blacklist. The Linkage Authority (LA) generates, from linkage seeds, linkage values which are used in the certificates and support efficient revocation. There are two LAs in the SCMS, referred to as LA1 and LA2. The Location Obscurer Proxy (LOP) hides the location of the requesting device by changing source addresses, and thus prevents linking of network addresses to locations. Additionally, when forwarding information to the Misbehavior Authority (MA), the LOP shuffles the reports to prevent the MA from determining the routes of vehicles reporting misbehavior. As disclosed in part of the above-reference copending '582 Application of V. Kumar et al., in conjunction with deriving the linkage values from linkage seeds, additionally encrypted linkage maps are produced that relate, in encrypted form, linkage values with linkage seeds from which they are derived, so that particular linkage values deemed to be of interest can be determined, based at least in part on information derived from misbehavior reports. Linkage seeds associated with particular linkage values of potentially misbehaving vehicles can subsequently be obtained utilizing decryptions of the encrypted linkage maps.

Figure 2:
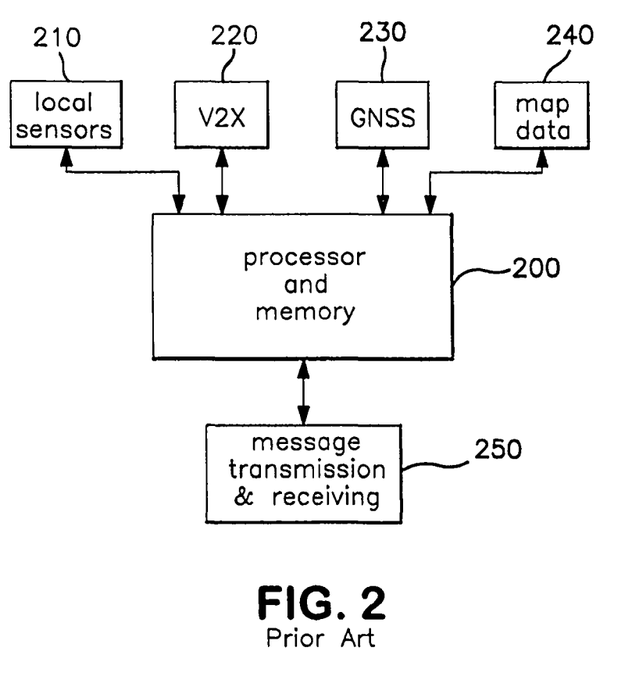
FIG. 2 is a block diagram of a vehicle's On Board Unit (OBU).

FIG. 2 is a block diagram of a prior art vehicle On Board Unit ("OBU"), shown in conjunction with some of the operational subsystems and components of a typical vehicle in a connected vehicle system. Reference can also be made to SAE specification J2945, which sets forth On Board System Requirements for V2V Safety Communications. The central processor unit and memory of the OBU are represented generally at 200. Interacting therewith are, typically, local sensors 210 (including cameras), V2X communication module 220, global navigation satellite system ("GNSS") 230, map data module 240, and message transmission and receiving subsystem 250. In the above-referenced copending '955 Application of J. Petit et al., a form of the disclosure is applicable for use in conjunction with a system for connected vehicle communications in which each vehicle in the system is issued a limited number of unique pseudonym certificates that are used by the vehicle to establish trust in messages sent by the vehicle by signing each message with a pseudonym certificate. A method is disclosed in the '955 Application, for selecting a pseudonym certificate for use, from among the vehicle's pseudonym certificates, so as to protect the privacy of the vehicle's activity against misbehavior such as attacks by eavesdroppers. The method includes steps of: tracking and storing vehicle location data; computing, from inputs that include the vehicle location data, the vehicle's relative achievable anonymity in particular geographical regions; prioritizing the pseudonym certificates; and selecting a pseudonym certificate for use from among the pseudonym certificates having a priority that is determined by the relative achievable anonymity for the geographical region in which the certificate is to be used.

The Onboard Unit (OBU) typically sends, receives, and processes messages coming from other vehicles or infrastructure (generally called Vehicle-to-X messages) to improve user's safety, driving experience and road efficiency. IEEE 1609.2 mandates the use of an authentication technique that provides node-centric trust (i.e. an OBU knows the received message is coming from an authorized and authenticated source). However, it is needed for an OBU to be able to assess the validity of the data being (authentically) transmitted, namely establish data-centric trust. This is a task of a local misbehavior detection system. The local misbehavior detection system runs on the vehicle system and analyzes incoming and outgoing V2X messages. When a misbehavior is detected, then one option for the misbehavior detection system is to generate a misbehavior report that contains the evidence of the misbehavior. This misbehavior report will then be transmitted to a backend server for further analysis. For example, the Security Credential Management System (SCMS), which is a security infrastructure that handles generation and revocation of security credentials, would receive such misbehavior reports to trigger a certificate revocation if deemed necessary. A revoked vehicle, i.e. its security credentials are revoked, will not be able to participate to the network and other entities receiving its messages will dismiss them. It is thus paramount to design an efficient local misbehavior detection system to ensure proper functioning of the overall system.

Other background techniques and systems, some of which utilize on board units (OBUs) and local processing, include the following: Schmidt, Robert K., Tim Leinm011er, Elmar Schoch, Albert Held, and Gunter Schafer, "Vehicle Behavior Analysis to Enhance Security in Vanets," In Proceedings of the 4th IEEE Vehicle-to-Vehicle Communications Workshop (V2VCOM2008), 2008; Park, Junkil, Radoslav Ivanov, James Weimer, Miroslav Pajic, and Insup Lee, "Sensor Attack Detection in The Presence of Transient Faults," In Proceedings of the ACM/IEEE Sixth International Conference on Cyber-Physical Systems, pp. 1-10, ACM, 2015; Kim, Tiffany Hyun-Jin, Ahren Studer, Rituik Dubey, Xin Zhang, Adrian Perrig, Fan Bai, Bhargav Bellur, and Aravind Iyer, "Vanet Alert Endorsement Using Multi-Source Filters," In Proceedings of the seventh ACM international workshop on VehiculAr InterNETworking, pp. 51-60, ACM, 2010; Cao, Zhen, Jiejun Kong, Uichin Lee, Mario Gerla, and Zhong Chen, "Proof-of-Relevance: Filtering False Data Via Authentic Consensus in Vehicle ad-hoc Networks," In IEEE INFOCOM Workshops 2008, pp. 1-6, IEEE, 2008; Firl, Jonas, et al., "MARV-X: Applying Maneuver Assessment for Reliable Verification of Car-to-X Mobility Data," IEEE Transactions on Intelligent Transportation Systems 14.3 (2013): 1301-1312; Sun, Mingshun, Ming Li, and Ryan Gerdes, "A Data Trust Framework for Vanets Enabling False Data Detection And Secure Vehicle Tracking,"2017 IEEE Conference on Communications and Network Security (CNS), IEEE, 2017; Han, Guangjie, et al., "Two Novel DOA Estimation Approaches for Real-Time Assistant Calibration Systems in Future Vehicle Industrial," IEEE Systems Journal 11.3 (2017): 1361-1372; Yao, Yuan, et al., "Multi-Channel Based Sybil Attack Detection in Vehicular Ad Hoc Networks Using RSSI," IEEE Transactions on Mobile Computing 18.2 (2019): 362-375; Yao, Yuan, et al., "Voiceprint: A Novel Sybil Attack Detection Method Based on RSSI for VANETs," 2017 47th Annual IEEE/IFIP International Conference on Dependable Systems and Networks (DSN), IEEE, 2017; Sun, Mingshun, Ming Li, and Ryan Gerdes, "Truth-Aware Optimal Decision-Making Framework with Driver Preferences for V2V Communications," 2018 *IEEE Conference on Communications and Network Security (CNS)*, IEEE, 2018; Van der Heijden, Rens W., Frank Kargl, and Osama MF Abu-Sharkh, "Enhanced Position Verification for Vanets Using Subjective Logic," 2016 IEEE 84th Vehicular Technology Conference (VTC-Fall), IEEE, 2016; and Yavvari, Chaitanya, Zoran Duric, and Duminda Wijesekera, "Vehicular Dynamics Based Plausibility Checking," 2017 IEEE 20th International Conference on Intelligent Transportation Systems (ITSC), IEEE, 2017. Also, see U.S. Pat. Nos. 8,214,147 and 9,990,844, and U.S. Patent Application Publications US2013/0217353, US2016/0140842, and US2017/0365171. For the most part, the approaches of these documents are quite specific to a particular type of plausibility, determination of a particular type of misbehavior, or determination that a specific type of attack may be in progress. It is among the objectives of the present application to provide a more comprehensive and complete solution to misbehavior recognition and protection.

SUMMARY OF THE APPLICATION

The present application provides a relatively comprehensive and complete solution to misbehavior recognition and protection in connected vehicle systems. The features described in the following summary provide substantial advantages over prior misbehavior protection approaches, such as those listed in the Background section hereof.

The present application is applicable for use in conjunction with a system that includes connected vehicle communications in which vehicles in the system each have an onboard processor subsystem and associated sensors, the processor subsystem controlling the generation, transmission, and receiving of messages communicated between vehicles for purposes including crash avoidance. In an aspect of the application, a method is set forth for determining, by a given vehicle receiving messages, the occurrence of misbehavior, including the following steps: processing received messages by performing a plurality of plausibility determinations to obtain a respective number of plausibility measurements; determining at least one context for the region at which said given vehicle is located; weighting said plurality of plausibility measurements in accordance with values determined from said at least one context to obtain a respective plurality of plausibility indicator values; and deriving a misbehavior confidence indicator using said plausibility indicator values.

In a form of this aspect, the steps of said method are implemented under control of at least one electronic processor subsystem, which can comprise said onboard unit operating in conjunction with at least one special purpose processor. In this form of the application, the misbehavior confidence indicator can comprise an array of said plausibility indicator values and/or a value derived from a count of plausibility indicator values that meet predetermined criteria, and/or a sum of at least a plurality of plausibility indicator values that meet predetermined criteria. Also in this form of the application, said step of performing a plurality of plausibility determinations comprises performing several plausibility determinations, and the plausibility determinations are performed either in parallel or in a series sequence.

A further form of this aspect of the application further comprises providing a number of misbehavior detection routines, and implementing said misbehavior detection routines in conjunction with said plausibility confidence indicator to obtain an indication of misbehavior that is occurring. The step of providing a number of misbehavior detection routines can comprise providing misbehavior detection routines which can recognize characteristics of behavior of message sources as being an indication of a particular type of cyber attack.

In another aspect of the application, a method for determining, by a given vehicle receiving messages, the occurrence of misbehavior, includes the following steps: processing received messages by performing a plurality of plausibility determinations to obtain a respective number of plausibility measurements from which a respective plurality of plausibility indicator values are derived; providing a plurality of misbehavior detection routines; implementing said misbehavior detection routines in conjunction with said plurality of plausibility indicator values; and determining the occurrence of misbehavior from the outputs of said misbehavior detection routines. A form of this aspect further comprises determining at least one context for the region at which said given vehicle is located, and said misbehavior detection routines are implemented in conjunction with values determined from said at least one context. In this aspect, the misbehavior detection routines can be performed in parallel or in a series sequence.

In another aspect of the application, a method is set forth for determining, by a given vehicle receiving messages, the occurrence of misbehavior, comprising the following steps: processing received messages by performing a plurality of plausibility determinations to obtain a respective number of plausibility measurements; determining at least one context for the region at which said given vehicle is located; deriving, from said at least one context, rankings of the plausibility determinations and their associated measurements, and weighting said measurements in accordance with the rankings to obtain an array of plausibility indicator values; providing a plurality of misbehavior detection routines; selecting at least some of the misbehavior detection routines in accordance with said at least one context; implementing the selected misbehavior routine in conjunction with respective members of the array of plausibility indicators; and determining occurrence of misbehavior from the outputs of the selected misbehavior detection routines.

In still another aspect of the application, a method is set forth for determining, by a given vehicle receiving messages, the occurrence of misbehavior, comprising the steps of: processing received messages by performing a plurality of plausibility determinations to obtain a respective number of plausibility measurements; determining at least one context for the region at which said given vehicle is located; deriving, from said at least one context, rankings of the plausibility determinations and their associated measurements; implementing plausibility determinations and weightings in accordance with values determined from said at least one context, in a sequence that depends on said rankings, and accumulating the resultant plausibility indications until said accumulation exceeds a predetermined threshold; providing a plurality of misbehavior detection routines; sequentially implementing each of said misbehavior detection routines in conjunction with said at least one context and said accumulation of plausibility indications to obtain a misbehavior output; and issuing a misbehavior warning depending on said misbehavior output.

Further feature and advantages of the application will become more readily apparent from the following detailed description when taken in conjunction with the accompanying drawings.

DETAILED DESCRIPTION

Figure 3:
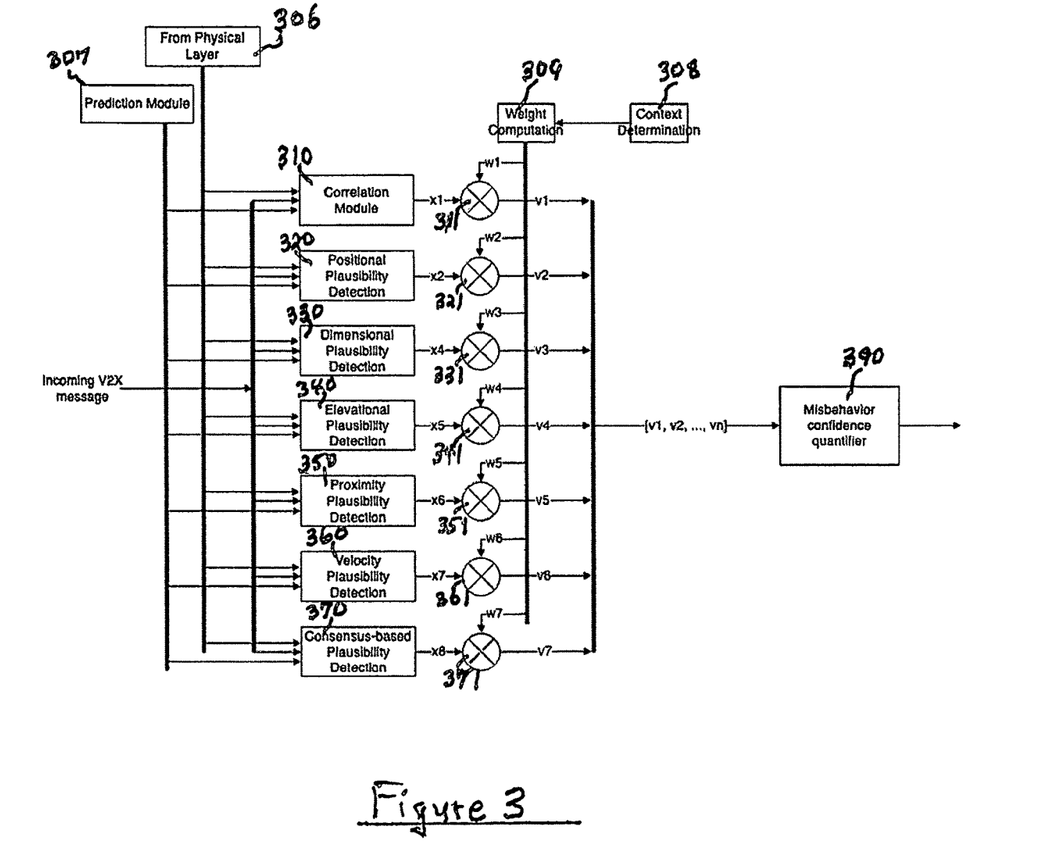
FIG. 3 is a flow diagram, partially in block form, of a routine for controlling a processor, such as the processor of the onboard unit (OBU), to implement an aspect of the application.

FIG. 3 is a flow diagram, partially in schematic block form, illustrating an aspect of the application for producing plausibility indicator values and a misbehavior confidence indicator. Received V2X messages, including especially V2V messages (typically basic safety messages (BSMs)), are shown as being input to detection modules 310, 320, 330, 340, 350, 360, and 370. The modules 310-370 each also receive signals representative of information, from the physical layer (as represented by the block 306), and from a prediction module (represented at 307). The information from the physical layer includes, for example, the direction of arrival and signal strength of received messages. The information from prediction module includes information regarding prior messages and the outputs of, for example, a Kalman filter and/or other known prediction algorithms or routines that determine, from prior messages and other information received from sensors and other available sources, prediction information that is used in computations that determine plausibility in accordance with routines employed by the detectors 310-370.

The correlation module plausibility detection (block 310) operates to find consistency between various parameters in a BSM/V2X message. For example:

If brakes have been applied, acceleration should be below zero (negative).

If acceleration is not zero, speed should not be zero.

The positional plausibility detection (block 320) operates to detect if the location claimed in a BSM is plausible. This detector can check whether:

The location is on a road.

If position is the same as seen in a previous BSM, speed should be zero.

The location overlaps a location sent in a BSM sent by another vehicle.

The location in current BSM is consistent with location in a previous BSM, based on speed and acceleration in previous BSM.

The dimensional plausibility detectiOn module (block 330) detects if the dimensions claimed in a BSM are plausible. This detector can check whether:

Length and width of a vehicle has changed over time.

Length and width correspond to acceleration and speed information of that type of vehicle.

Abnormal length and width information is being transmitted, e.g. a 4-lane wide vehicle.

The elevational plausibility detection module (block 340) operates to detect if the elevation claimed in a BSM is plausible. This detector can check whether:

A claimed elevation corroborates to a particular location, e.g. elevation claims vehicle is on a bridge whereas no bridge exists in that location.

A high modulation occurs in elevation values between consecutive BSMs.

The proximity plausibility detection module (block 350) operates to detect proximity between vehicles, and is similar to positional plausibility.

The velocity plausibility detection (block 360) operates to detect if the velocity/speed information correlates to information in same BSM or previous BSMs. For example:

If position in consecutive BSMs does not change, is the speed zero.

The consensus-based plausibility detection (block 370) relies on information from neighboring vehicles. Consensus can be reached on traffic events, such as, an accident or an event where a vehicle performed extremely dangerous braking. These techniques are used to gather evidence of such an event in case the misbehavior protection system on a local vehicle detects a misbehavior.

The functions of detectors 310-370 can be performed using hardware and/or software implementations. Special-purpose processor modifications of an OBU (see e.g. FIG. 6), such as can be achieved with specialized chips, would provide the substantial advantage of high speed on-board implementation.

A context determination module 308 receives inputs that will be described hereinbelow, and produces signals representative of settings, conditions, and circumstances in the region surrounding the vehicle. The output of the context detection block is received by weighting computation module 309, which computes the relative significance, for particular current context(s), of each plausibility measurement, and outputs respective weights for that reflect such significance. In FIG. 3, the plausibility measurements output from plausibility detectors 310, 320, 330, 340, 350, 360, and 370 (respectively designated x1, x2, x3, x4, x5, x6, and x7), are respectively coupled, as an input, to multipliers 311, 321, 331, 341, 351, 361, and 371, each of which receives, as its other input, the particular weighting to be applied to the plausibility measurement. The weighted plausibility measurements (designated v1, v2, v3, v4, v5, v6, and v7), called plausibility indicator values, are output, as a one-dimensional array, to misbehavior confidence quantifier 390 which, in this aspect, can provide a weighted sum of the input values and/or a count of plausibility indicator values that meet a predetermined criterion, such as exceeding a particular threshold, or a combination of such values to be taken as a misbehavior confidence indicator. In aspects hereof, the array of weighted outputs and/or the misbehavior confidence indicators can be provided, as some of the inputs to misbehavior detection routines.

Figure 4:
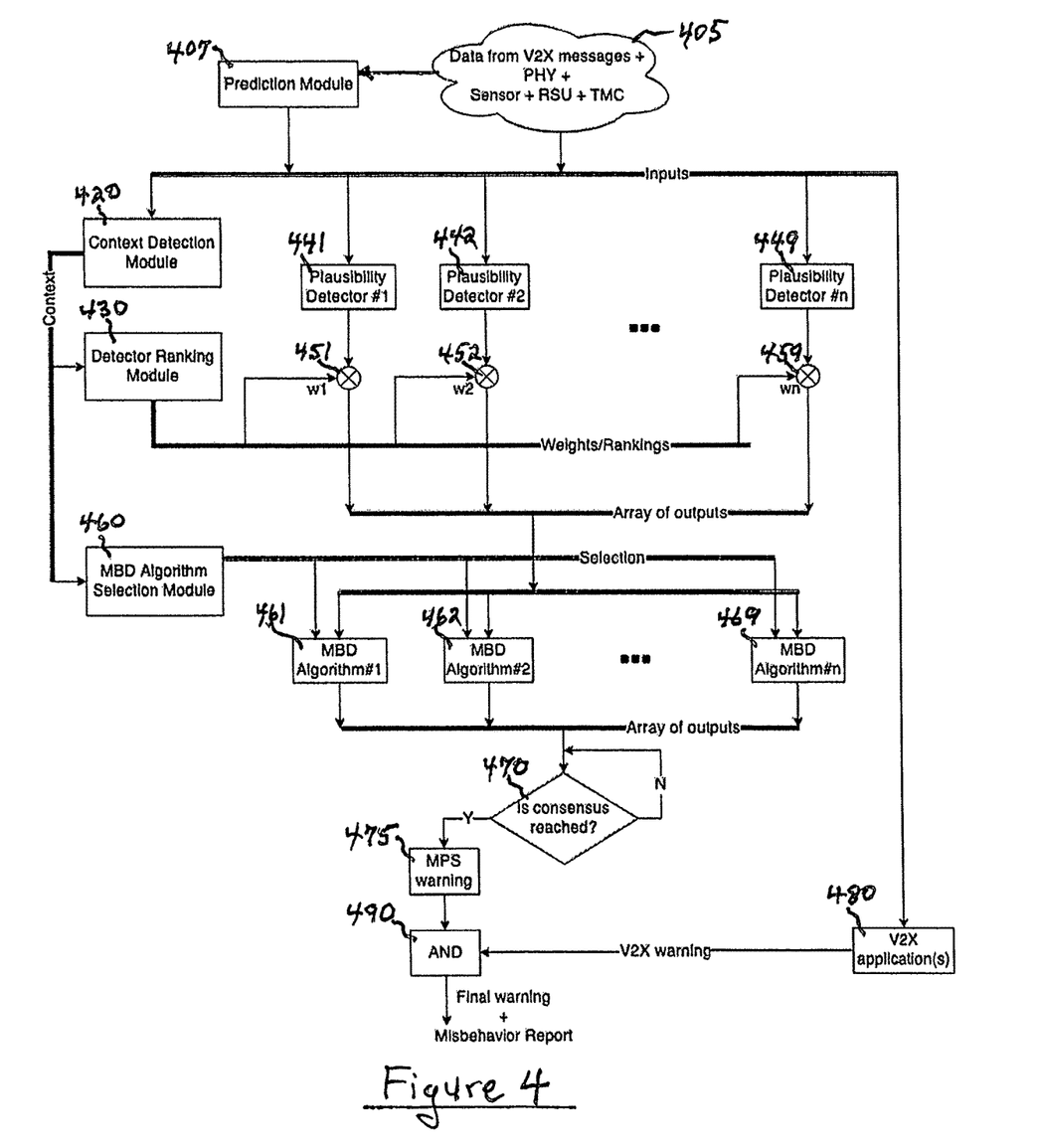
FIG. 4 is a flow diagram, partially in block form, of a routine for controlling a processor, such as the processor of the onboard unit (OBU), to implement another aspect of the application.

FIG. 4 is a diagram of a routine under control of a processor, for example the processor of the onboard unit, for implementing an aspect of the application. Available signals, representative of input information, are represented in the region 405. The exemplary inputs shown in region 405 include V2X messages (including messages such as basic safety messages (BSMs) from other vehicles, messages from control authorities, messages from roadside units, etc.), physical layer data (PHY), and sensor data (such as data from cameras and other sensors, global positioning data, etc.). As in the FIG. 3 aspect, inputs from a prediction module 407 can also be utilized. The inputs are provided to context determination module 420 and to plausibility detector #1 (block 441) plausibility detector #2 (block 442) plausibility detector #n (block 449). The context determination module 420 operates, as previously described, to determine the context in which the vehicle is operating, and the determined context is provided as an input to the blocks 430 and 460. The detector ranking module block 430 functions to rank the plausibility detectors based on their significance in situations that arise when a particular context or contexts are deemed to be present. As an example, when a context determination of high density of traffic is made, the plausibility detector for proximity plausibility detector will be assigned a relatively high ranking, and the plausibility detector for dimensional plausibility detection will be assigned a relatively low ranking. The block 430 provides weightings to the plausibility detector outputs. This is implemented using multipliers 451, 452, ... 459, which respective apply the weightings w1, w2, ... wn.

The output of the context determination module 420 is also coupled to misbehavior algorithm selection module 460 which selects from among the available algorithms (routines) that implement misbehavior detection. These can include, for example, known algorithms based on single threshold analysis, combined threshold analysis, exponentially weighted moving average analysis, artificial intelligence (AI) based technique, machine learning based technique, or deep learning based technique. The selected misbehavior detection algorithms, designated MBD algorithm #1 (block 461), MBD algorithm #2 (block 462), ... MBD algorithm #n (block 469), can be implemented in parallel, which is facilitated and expedited by special purpose processors, e.g. a specialized chip for each algorithm (routine).

Figure 6:
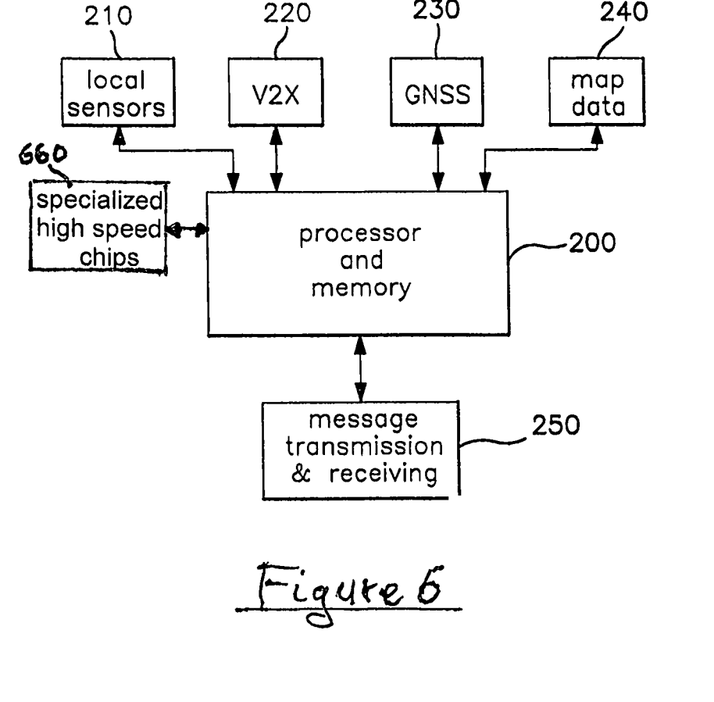
FIG. 6 is a block diagram illustrating of an OBU that can be used in practicing aspects of the application.

FIG. 6 illustrates an onboard unit (OBU) which has been equipped with special purpose high speed chips (660), especially for implementing the misbehavior detection algorithm routines hereof.

Returning to FIG. 4, the array of outputs from the misbehavior algorithms are coupled to decision block 470, which determines whether a consensus of the selected algorithm outputs been reached. If not, the block 470 is re-entered for determination at the next cycle. If affirmative, however, a misbehavior warning is issued (block 475), and a positive indication is, in this aspect, optionally input to AND gate 490, which receives, as its other input, a signal which is positive when a standard V2X application safety warning is issued. If the inputs to gate 490 are both positive, a final warning can be issued, and a misbehavior report can be communicated to central authority.

Figure 5:
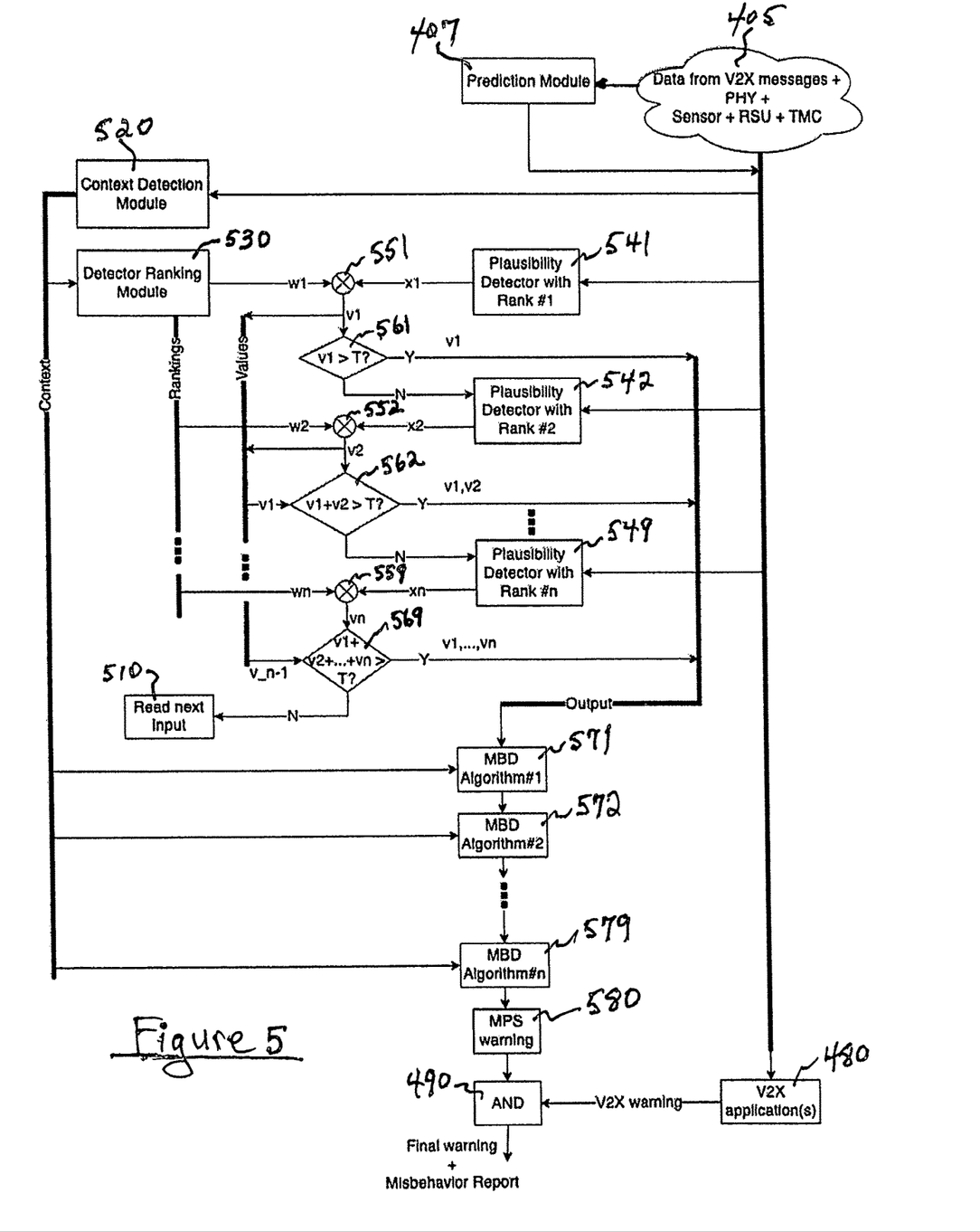
FIG. 5 is a flow diagram, partially in block form, of a routine for controlling a processor, such as the processor of the onboard unit (OBU), to implement a further aspect of the application.

The aspect of FIG. 5, utilizes, inter alia, serial processing of plausibility detection and of subsequent implementation of misbehavior detection algorithms. In FIG. 5, the input information signals from sources indicated in region 405 and block 407 can be the same as described for like reference numerals in FIG. 4. The context detection module 520 and detector ranking module 530 are functionally similar to the blocks 420 and 430, respectively. In this aspect, the plausibility detectors with ranks #1 (block 541), #2 (block 542), ... #n (block 549) receive the indicated inputs and produce, in the ranked sequence (and if reached in the process, as will become clear), output values respectively designated x1, x2, ... xn, which are coupled to respective multipliers 551, 552, ... 559, which also receive respective weighting signals w1, w2, ... wn from ranking module 530, and produce respective output plausibility indicator values v1, v2, ... vn. In operation, the value v1 is input to decision block 561, and a determination is made as to whether v1 is greater than a predetermined threshold T. If so, v1 is output to the first misbehavior detection algorithm (block 571), and the serial MBD processing can begin. If not, the next plausibility detection module is called upon, and its weighted output value v2, as well as the previous weighted value v1 (received via the bold vertical "values" line), are input to decision block 562, which determines whether the sum v1 plus v2 is greater than the threshold T. If not, the process continues, as the next output value is accumulated at the next decision block, whereas, if so, v1, v2 are output as inputs to the first misbehavior detection algorithm (block 571). Eventually, if the decision blocks keep indicating that the accumulated sum does not exceed the threshold, the decision block 569 is reached, and the sum v1+v2+ ... vn is tested against the threshold. If T is exceeded, v1, v2, ... vn are output to block 571 but, if not exceeded, the process, for the current input, does not provide a finding of the plausibility of misbehavior, and the next input is read in (block 510) for processing. Once the block 571 is entered, the accumulated plausibility values are used, as well as the current context, in serially applying the routines of MBD algorithms #1 (block 571), #2 (block 572) #n (block 579), and an MPS warning (block 580), if warranted, is issued.

Then, as in FIG. 4, the indications of an MPS warning and a V2X warning (from block 480) can be ANDed (block 490) to determine whether a final warning and misbehavior report are warranted.

The invention claimed is:

1. An apparatus for determining one or more occurrences of vehicle misbehavior, comprising:
    at least one memory; and
    at least one processor coupled to the at least one memory, the at least one processor configured to:
        process one or more received messages at least in part by performing a plurality of plausibility determinations to obtain a respective plurality of plausibility measurements;
        determine at least one context for a region at which a vehicle is located;
        weight the plurality of plausibility measurements in accordance with values determined from the at least one context to obtain a respective plurality of plausibility indicator values; and
        determine a misbehavior confidence indicator using the plurality of plausibility indicator values.

2. The apparatus of claim 1, wherein the at least one processor includes at least one electronic processor subsystem.

3. The apparatus of claim 2, wherein the at least one electronic processor subsystem comprises an onboard processor subsystem operating in conjunction with at least one special purpose processor.

4. The apparatus of claim 1, wherein the misbehavior confidence indicator comprises an array of the plurality of plausibility indicator values.

5. The apparatus of claim 1, wherein the misbehavior confidence indicator comprises a value derived from a count of the plurality of plausibility indicator values that meet predetermined criteria.

6. The apparatus of claim 1, wherein the misbehavior confidence indicator comprises a sum of at least the plurality of plausibility indicator values that meet predetermined criteria.

7. The apparatus of claim 1, wherein, to determine the at least one context, the at least one processor is configured to determine a plurality of contexts.

8. The apparatus of claim 1, wherein the at least one processor is configured to perform the plurality of plausibility determinations in parallel.

9. The apparatus of claim 1, wherein the at least one processor is configured to perform the plurality of plausibility determinations in a series sequence.

10. The apparatus of claim 1, wherein the at least one processor is configured to:
    provide one or more misbehavior detection routines; and
    implement the one or more misbehavior detection routines in conjunction with the misbehavior confidence indicator to obtain an indication of misbehavior.

11. The apparatus of claim 10, wherein the indication of occurrence of misbehavior comprises an indication of a particular type of cyber attack.

12. The apparatus of claim 10, wherein the one or more misbehavior detection routines are configured to recognize characteristics of behavior of message sources as being an indication of a particular type of cyber attack.

13. The apparatus of claim 1, wherein, to determine the at least one context, the at least one processor is configured to determine at least one context from at least one of a vehicle population, a neighboring vehicle telemetry, a time of day, weather, a risk-threat model, computation overhead, communication overhead, location, or environment.

14. The apparatus of claim 1, wherein the apparatus is configured as part of a vehicle.

15. An apparatus for determining one or more occurrences of vehicle misbehavior, comprising:
    at least one memory; and
    at least one processor coupled to the at least one memory, the at least one processor configured to:
        process one or more received messages at least in part by performing a plurality of plausibility determinations to obtain a respective plurality of plausibility measurements from which a respective plurality of plausibility indicator values are derived;
        implement a plurality of misbehavior detection routines in conjunction with the plurality of plausibility indicator values; and
        determining an occurrence of at least one misbehavior from outputs of the plurality of misbehavior detection routines.

16. The apparatus of claim 15, wherein the at least one processor includes at least one electronic processor subsystem.

17. The apparatus of claim 16, wherein the at least one electronic processor subsystem comprises an onboard processor subsystem operating in conjunction with at least one special purpose processor.

18. The apparatus of claim 15, wherein the at least one processor is configured to determine at least one context for a region at which a vehicle is located, and wherein the plurality of misbehavior detection routines are implemented in conjunction with values determined from the at least one context.

19. The apparatus of claim 15, wherein the at least one processor is configured to perform the plurality of misbehavior detection routines.

20. The apparatus of claim 15, wherein the at least one processor is configured to perform the plurality of misbehavior detection routines in a series sequence.

21. The apparatus of claim 15, wherein the apparatus is configured as part of a vehicle.

22. An apparatus for determining one or more occurrences of vehicle misbehavior, comprising:
    at least one memory; and
    at least one processor coupled to the at least one memory, the at least one processor configured to:
        process one or more received messages at least in part by performing a plurality of plausibility determinations to obtain a respective plurality of plausibility measurements;
        determine at least one context for a region at which a vehicle is located;
        derive, based on the at least one context, rankings of the plurality of plausibility determinations and the respective plurality of plausibility measurements;
        weight the plurality of plausibility measurements in accordance with the rankings to obtain an array of plausibility indicator values;
        select at least one misbehavior detection routine from a plurality of misbehavior detection routines in accordance with the at least one context;
        implement the selected at least one misbehavior detection routine in conjunction with one or more respective plausibility indicator values of the array of plausibility indicator values; and determine an occurrence of misbehavior from at least one output of the selected at least one misbehavior detection routine.

23. The apparatus of claim 22, wherein the apparatus is configured as part of a vehicle.

24. An apparatus for determining one or more occurrences of vehicle misbehavior, comprising:
- at least one memory; and
- at least one processor coupled to the at least one memory, the at least one processor configured to:
  - process one or more received messages at least in part by performing a plurality of plausibility determinations to obtain a respective plurality of plausibility measurements;
  - determine at least one context for a region at which a vehicle is located;
  - derive, based on the at least one context, rankings of the plurality of plausibility determinations and the respective plurality of plausibility measurements;
  - implement plausibility determinations and weightings in accordance with values determined from the at least one context, in a sequence that depends on the rankings;
  - accumulate plausibility indications based on implementing the plausibility determinations and weightings until accumulation exceeds a predetermined threshold;
  - provide a plurality of misbehavior detection routines;
  - implement a plurality of misbehavior detection routines in conjunction with the at least one context and the accumulation of plausibility indications to obtain a misbehavior output; and
  - issue a misbehavior warning depending on the misbehavior output.

25. The apparatus of claim 24, wherein the apparatus is configured as part of a vehicle.

* * * * *